US007013195B2

(12) United States Patent
Maki

(10) Patent No.: US 7,013,195 B2
(45) Date of Patent: Mar. 14, 2006

(54) WIRE ELECTRIC DISCHARGE MACHINING APPARATUS

(75) Inventor: Susumu Maki, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 252 days.

(21) Appl. No.: 10/642,146

(22) Filed: Aug. 18, 2003

(65) Prior Publication Data

US 2004/0172154 A1    Sep. 2, 2004

(30) Foreign Application Priority Data

Aug. 21, 2002   (JP) ............................. 2002-240179

(51) Int. Cl.
*G06F 19/00*         (2006.01)
(52) U.S. Cl. ...................... 700/180; 700/162; 219/69.1
(58) Field of Classification Search ................ 700/180, 700/182, 159, 162, 83; 219/69.1, 69.11, 219/69.12; 318/569
See application file for complete search history.

(56) References Cited

U.S. PATENT DOCUMENTS 5,083,000 A * 1/1992 Sakaue ..................... 219/69.12
5,453,592 A * 9/1995 Takeuchi et al. ......... 219/69.17
5,514,941 A * 5/1996 Kita ........................... 318/569
5,585,014 A * 12/1996 Magara .................... 219/69.13

* cited by examiner

*Primary Examiner*—Zoila Cabrera
(74) *Attorney, Agent, or Firm*—Staas & Halsey LLP

(57) ABSTRACT

In a wire electric discharge machining apparatus, data on the number of machining shapes and the machining frequency of each of the machining shapes are acquired by analyzing the machining program and acquiring data on the machining starting positions, and those data are stored. Displaying the stored data on a screen is used to check as to whether the number of machining shapes and the machining frequency relating to each machining shape have been programmed correctly or not.

8 Claims, 9 Drawing Sheets

FIG. 3A

```
O100(main pro)
S1 D1
M98 P110 (sub pro 1)
G00 X20.0  Y5.0
M98 P120 (sub pro 2)
G00 X-20.0 Y-10.0
M98 P120 (sub pro 2)
G00 X20.0
M98 P110 (sub pro 1)
G00 X-20.0 Y10.0
 S2 D2
    :
    :
 M30
```

FIG. 3B

```
O110(sub pro)
M60
G92 X0 Y0
G01 G90 G41 Y_
    :
    :
    :

G40 X_ Y_.
M50
M99
```

| n (MACHINING NUMBER) | MACHINING STARTING POSITION Mx(n) | MACHINING STARTING POSITION My(n) | MACHINING ESTIMATION FREQUENCY Mc(n) |
|---|---|---|---|
| 0 | -100.0000 | -100.0000 | 4 |
| 1 | -80.0000 | -100.0000 | 4 |
| 2 | -100.0000 | -110.0000 | 4 |
| 3 | -80.0000 | -110.0000 | 4 |
| 4 | | | |
| 5 | | | |
| 6 | | | |
| 7 | | | |
| 8 | | | |
| 9 | | | |
| 10 | | | |
| 11 | | | |
| 12 | | | |
| 13 | | | |
| 14 | | | |
| 15 | | | |

| MACHINING NUMBER | MACHINING ESTIMATION FREQUENCY | | | | | | |
|---|---|---|---|---|---|---|---|
| | 1 | 2 | 3 | 4 | 5 | 6 | 7 |
| 1 | - | - | - | - | | | |
| 2 | - | - | - | - | | | |
| 3 | - | - | - | - | | | |
| 4 | - | - | - | - | | | |
| 5 | | | | | | | |
| 6 | | | | | | | |
| 7 | | | | | | | |
| 8 | | | | | | | |
| 9 | | | | | | | |
| 10 | | | | | | | |

FIG. 10

| MACHINING NUMBER | MACHINING ESTIMATION FREQUENCY | | | | | | |
|---|---|---|---|---|---|---|---|
| | 1 | 2 | 3 | 4 | 5 | 6 | 7 |
| 1 | - | - | - | - | | | |
| 2 | - | - | / | / | | | |
| 3 | - | - | / | / | | | |
| 4 | / | / | / | / | | | |
| 5 | | | | | | | |
| 6 | | | | | | | |
| 7 | | | | | | | |
| 8 | | | | | | | |
| 9 | | | | | | | |
| 10 | | | | | | | |

FIG. 11

| n (MACHINING NUMBER) | MACHINING STARTING POSITION Mx(n) | CHINING STARTING POSITION My(n) | MACHINING ESTIMATION FREQUENCY Mc(n) | MACHINING DETERMINED FREQUENCY Mc(n)' |
|---|---|---|---|---|
| 0 | -100.0000 | -100.0000 | 4 | 4 |
| 1 | -80.0000 | -100.0000 | 4 | 4 |
| 2 | -100.0000 | -110.0000 | 4 | 2 |
| 3 | -80.0000 | -110.0000 | 4 | 0 |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

WIRE ELECTRIC DISCHARGE MACHINING APPARATUS

BACKGROUND OF THE INVENTION

1. Field of the Invention

The present invention relates to a wire electric discharge machining apparatus in which the machining outline can be checked.

2. Description of the Prior Art

In machining with a wire electric discharge machining apparatus, a plurality of machining shapes are typically machined based on a single machining program. When multiple machining operations are thus conducted on a plurality of machining shapes, the process from the initiation of machining program execution to completion of machining according to this machining program takes a long time and the wire electric discharge machining apparatus is usually operated in an automatic mode, for example, in the nighttime.

When a plurality of machining shapes are machined with a single machining program, as described above, the machining takes a long time and is usually conducted in an automatic operation mode of a wire electric discharge machining apparatus. For this reason, it remains unclear how many machining shapes are to be machined or how many times the machining (rough machining, finish machining) of a single machining shape is to be conducted. Machining is conducted in an automatic mode in the nighttime and the machining progress state is first verified by viewing the machining state in the morning. Therefore, the machining end is difficult to predict when the machining is started.

There are also cases in which the machining shapes which presently require no machining are programmed in the machining program or an unnecessary large number of finish machining operation are programmed. However, the machining outline that has thus been programmed cannot be clarified in advance. Furthermore, it is sometimes desirable to machine urgently only a certain machining shape that has been programmed in a machining program, but to select and machine this shape is difficult. Moreover, a machining starting hole has to be machined in advance for each machining shape in order to conduct machining of a plurality of machining shapes. However, in a case where machining starting hole is forgotten to be machined on a workpiece or a machining starting hole is machined on a workpiece in a wrong position, and such a workpiece is set in a wire electric discharge machining apparatus and then an automatic nighttime operation is started, expecting the machining of the workpiece to be completed in the next morning, there may be cases in which no machining is conducted and subsequent operations are impeded.

SUMMARY OF THE INVENTION

It is an object of the present invention to provide a wire electric discharge machining apparatus such that a machining outline can be checked before the machining is started and setting can be made in advance so that only the required machining is conducted.

In order to attain the above-described object the wire electric discharge machining apparatus in accordance with the present invention comprises means for analyzing a machining program and acquiring machining starting positions, means for calculating and storing the acquisition frequency for each acquired machining starting position, and means for displaying the number of machining shapes and the machining frequency of each machining shape from the data stored in the storage means.

The wire electric discharge machining apparatus in accordance with the present invention assumes the following modes.

Thus, means is provided for successively reading the machining starting positions stored in the storage means, causing the movement to each machining starting position that was read out and the automatic wire connection operation, and conducting checking of a machining starting hole. In this case, means is provided for displaying the presence or absence of the machining starting hole based on the signal indicating whether the automatic wire connection was made or not.

Means is provided for successively reading the machining starting positions stored in the storage means and causing the movement to each machining starting position that was read out and a stop at the prescribed time, thereby allowing the operator to check the machining starting holes.

Checking the machining starting holes by the operator is facilitated by providing machining hole check input means and means for successively reading the machining starting positions stored in the storage means, causing the movement to each machining starting position that was read out and a stop at the prescribed time, and causing the movement to the next machining starting position each time a check signal is input from the machining hole check input means. In this case, the machining hole check input means comprises means for generating a check signal indicating the presence of a machining starting hole and a check signal indicating the absence of a machining starting hole, and the apparatus further comprises means for receiving the signals from the machining hole check input means and displaying the presence or absence of the machining starting hole.

Means is provided for setting the presence or absence of machining for each machining shape and machining frequency based on the data on the number of machining shapes and machining frequency of each machining shape.

Further provided are display control means for drawing the machining shape on the display means based on the machining program and means for displaying the indexes of machining order based on the information sequence of machining starting positions stored in the storage means when the machining shape is drawn.

In accordance with the present invention, the number of machining shapes and the machining frequency for each shape can be clarified in advance prior to executing the machining program and conducting the machining. Furthermore, it can be checked in advance whether a machining starting hole has been provided or not. Moreover, machining that has been programmed in a machining program can be selectively prevented from being conducted ineffectively, machining operation process can be clarified in advance when automatic operation such as nighttime operation is executed, and such an automatic operation can be effectively executed with good efficiency.

BRIEF DESCRIPTION OF THE DRAWINGS

The above-mentioned and other objects and features of the present invention will become more apparent from the following description of embodiments thereof taken in conjunction with the accompanying drawings.

FIG. 3 illustrates an example of a machining program for conducting continuous machining of a plurality of machining shapes;

FIG. 9 illustrates a display example in which the machining estimation frequency of the machining shape of the embodiment of the present invention is displayed;

FIG. 10 illustrates a display example of machining schedule management in the embodiment of the present invention;

FIG. 11 is an explanatory drawing illustrating an example in which a memory unit storing the machining determined frequency is provided correspondingly to the machining starting position table;

DETAILED DESCRIPTION OF THE PREFERRED EMBODIMENTS

Figure 1:
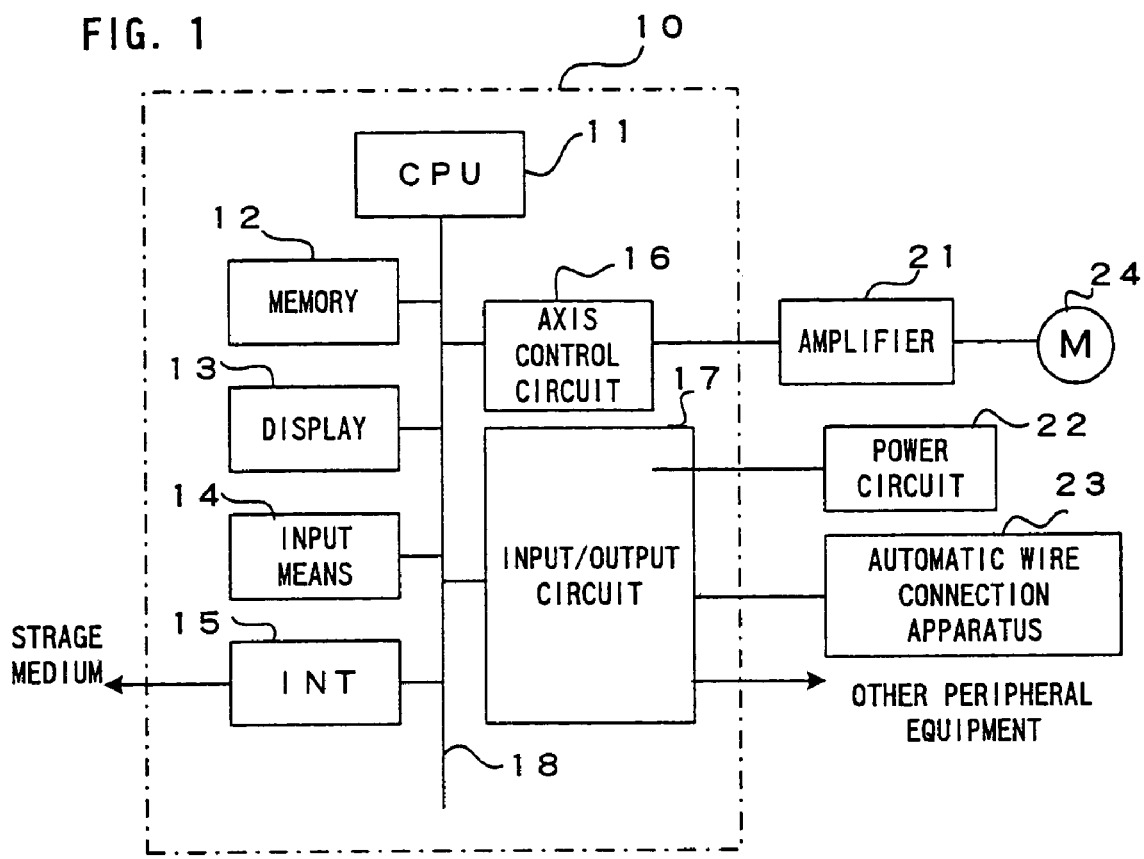
FIG. 1 is a block diagram of the main components of the wire electric discharge machining apparatus of the embodiment of the present invention.

FIG. 1 is a block diagram of the main components of the embodiment of the present invention, the description being focused on a controller of a wire electric discharge machining apparatus. The reference numeral 10 denotes a controller composed, for example, of a numerical controller for controlling a wire electric discharge machining apparatus. The controller 10 is composed of a processor 11, a memory 12 composed of ROM, RAM, or the like and connected with a bus 18 to the processor 11, a display device 13, input means 14 such as a keyboard or the like, an interface 15 for inputting or outputting, e.g., a machining program from an external storage medium, axis control circuits 16, and an input/output circuit 17.

The axis control circuits 16 control motors for driving an X axis and an Y axis for driving a table having a workpiece placed thereon along the X axis direction and the Y axis direction perpendicular thereto, a Z shaft for moving an upper guide in the direction perpendicular to the X axis and the Y axis, and a U shaft for taper machining and a V shaft perpendicular thereto. Further, the axis control circuits 16 comprise means for feedback control of the position of each respective shaft, speed, and electric current. Servo motors 24 for respective shafts are connected via servo amplifiers 21 for each shaft to the axis control circuits 16 for each shaft. Position and speed detectors are mounted on each servo motor, and the position and speed are feedback sent to respective axis control circuits (not shown in FIG. 1).

Further, the input/output circuit is connected to a power source circuit 22 for generating an electric discharge by applying a voltage between the workpiece and the wire of the wire electric discharge machining apparatus, an automatic wire connection apparatus 23 for passing a wire electrode, e.g., into a machining starting hole of the workpiece, and also to other peripheral equipment.

The above-described configuration of the wire electric discharge machining apparatus is identical to that of the conventional well-known wire electric discharge machining apparatuses. In the present invention, a new function is added by using hardware of the conventional wire electric discharge machining machine.

In accordance with the present invention, when machining of a plurality of machining shapes is conducted continuously with a single machining program, the machining outline of this single machining program can be clarified and checked in advance.

Figure 2:
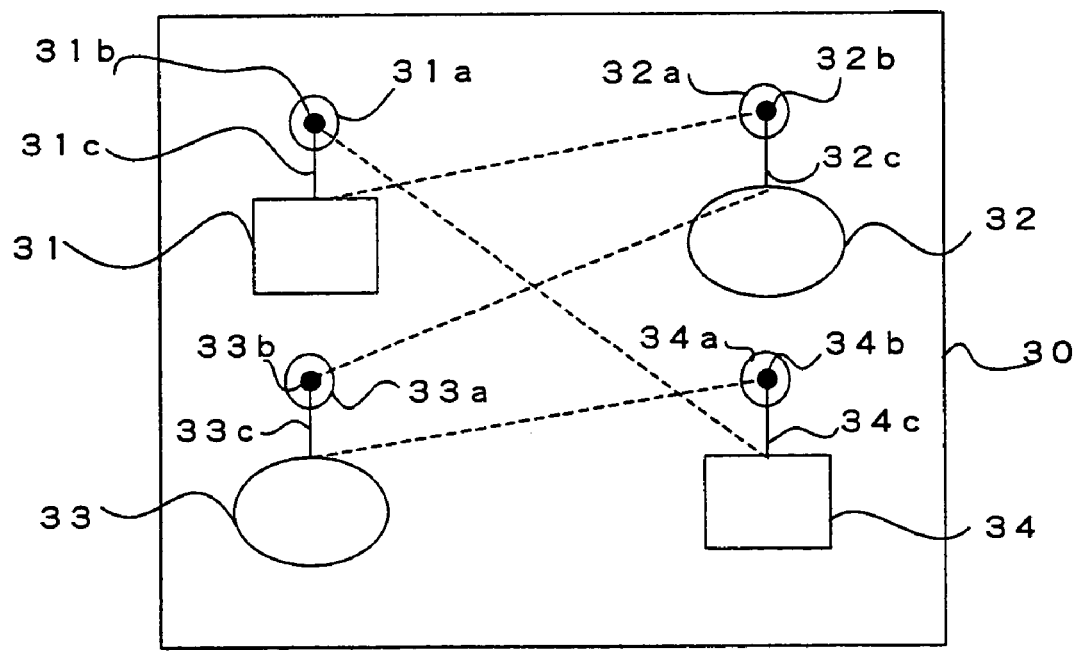
FIG. 2 is an explanatory drawing relating to the case in which a plurality of machining shapes are machined continuously.

FIG. 2 is an explanatory drawing relating to the case in which a plurality of machining shapes are machined continuously. In FIG. 2, the reference numerals 31–34 denote machining shapes, the reference numerals 31a–34a denote machining starting holes of each machining shape, and the reference numerals 31b–34b denote wire connection position, that is, machining starting positions, in which the wires are inserted in machining starting holes. Solid lines in the figure illustrate machining of a workpiece 30 with a wire electrode, and the broken line illustrates a fast-feed movement.

For example, the wire electrode is passed through the machining starting hole 31a and connected, machining is initiated, machining of an introduction portion 31c is conducted, and then machining of the machining shape 31 is conducted. Then, the wire is disconnected, moved by fast feed to the next machining starting position 32b, inserted into the machining starting hole 32a, and connected, and the machining shape 32 is similarly machined. Thus, the machining shapes 31–34 are continuously and automatically machined by repeatedly executing the operations of wire connection, machining, and wire disconnection in the machining starting positions where the machining starting holes have been provided.

When the above-described machining is conducted, the machining program assumes the form such as shown in FIGS. 3A and 3B. FIG. 3A shows the main program and FIG. 3B shows the sub-program. Text in the parentheses shown in the programs is for explanation purpose. The program is assumed to be such that in a state in which positioning has been made to the machining starting position the main program is executed.

Explanation hereinbelow will be conducted with reference to the example shown in FIG. 2. Once positioning has been made to the machining starting position 31b, the main program "100" is executed by reading the offset and machining conditions set in a code S1D1 and reading a sub-program "110" shown in FIG. 3B with a read command "M98P110" of the subprogram "110".

With this sub-program, a wire connection command "M60" is initially programmed, according to this command the processor 11 of the controller outputs a wire connection command to the automatic wire connection unit 23, the automatic wire connection unit 23 allows the wire to be inserted into the machining starting hole 31a and connected, and a completion signal is returned to the controller 10 once the wire connection has been completed. The processor 11 of the controller 10 conducts setting of the system of coordinate with a code "G92", and if the wire connection completion signal is received, initiates the machining of the machining shape according to a code "G01". Further, "G90" is an absolute command, and "G41" means the left offset correction.

Machining is then conducted according to a machining route programmed in the sub-program. For example, a machining shape denoted by the reference numeral 31 in FIG. 2 is machined, if the machining of the machining shape 31 is ended and a correction cancel command "G40" and disconnection command "M50" are read from the program, the offset correction is canceled, wire disconnection is conducted, the program end code "M99" of the sub-program is read out and the processing flow returns to the main program.

In the main program, a fast-feed command "G00" for a fast feed to the next machining starting position is read, the wire is moved by fast feed to the next machining starting position, that is, the machining starting position 32b shown in FIG. 2, and positioned therein. Then, the subprogram of machining of the next machining shape is read. Subsequent operations are identical to the above-described operations.

This program example makes it clear that the code of wire connection command "M60" is always programmed. Furthermore, the machining starting position is indicated when the cutting feed codes (G01, G02, G03), which first appears after the "G00" code of the fast-feed command, are read. Therefore, a position can be decided to be a machining starting position of a machining shape when the code "G00" was read and then the code "G01" or "G02" or "G03" was read.

Further, one machining shape corresponds to a machining starting position, and in this configuration a plurality of machining positions are not linked to one machining starting hole (machining starting position). Therefore, detecting the machining starting positions makes it possible to know the number of machining shapes. Further, if the machining starting positions are identical, it means that finish machining is conducted with respect to the same machining shape and the machining frequency relating to the same machining shape can be detected.

Figure 4:
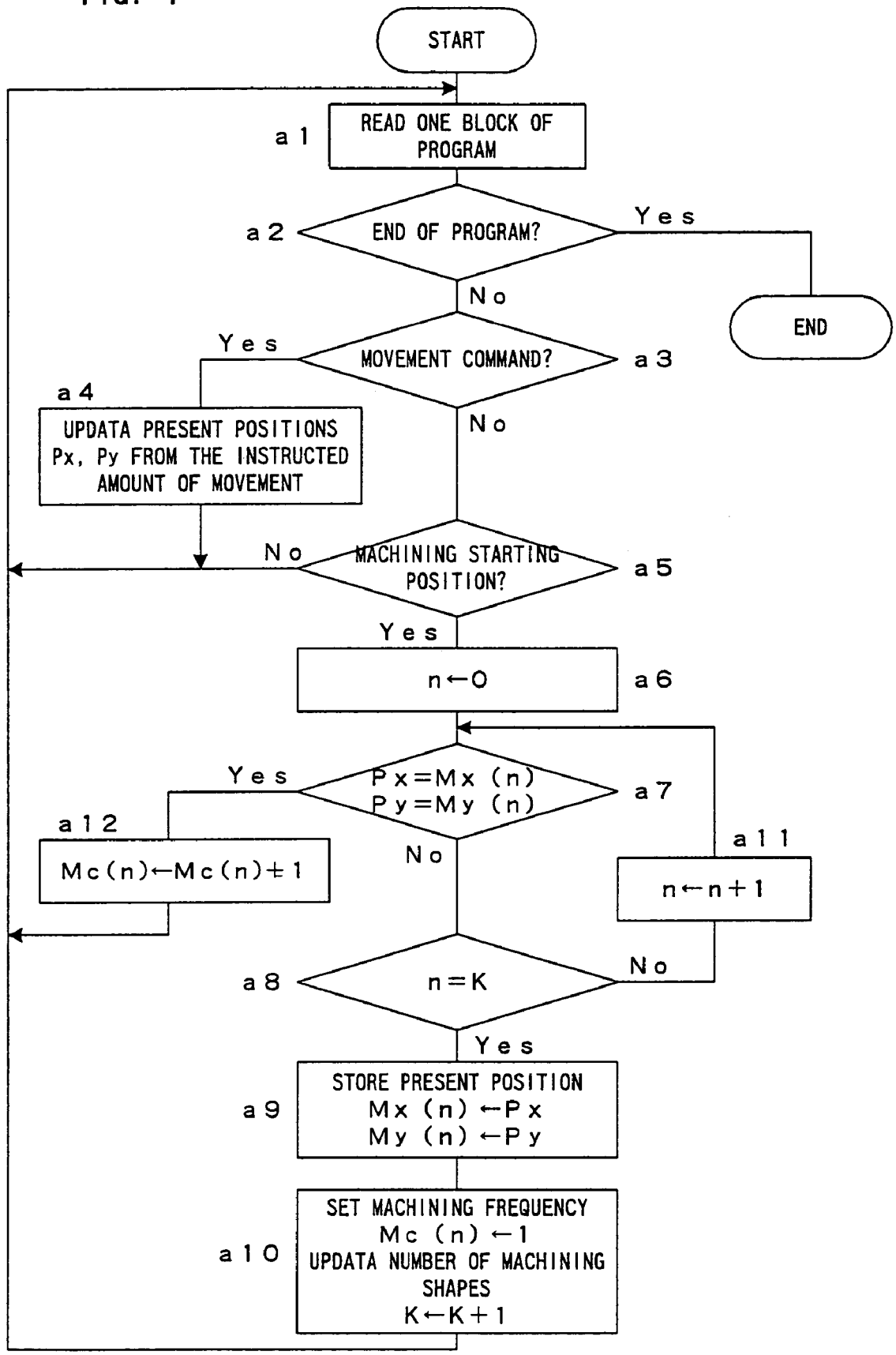
FIG. 4 is a flow chart of machining outline detection processing in the embodiment of the present invention.

When a machining program for machining a plurality of machining shapes is input from an external storage medium via, e.g., the interface 15 and stored in the memory 12 and machining is initiated based on this machining program, if a machining outline detection command is input from the input means 14 in order to find the number of machining shapes and the machining frequency according to this machining program prior to machining initiation, then the processor initiates the processing illustrated by FIG. 4.

The processor 11 reads one block from the head of the machining program (step a1) and decides as to whether the program command that has been read out is the program end or not (step a2). If it is not the end, the processor makes a decision as to whether it is a movement command or not (step a3). If it is a movement command, a register storing the values Px, Py of the X axis and Y axis in the present position is updated from the instructed movement amount (step a4), and the processing flow returns to step a1. On the other hand, if the command read out in step a3 is not the movement command, then a decision is made as to whether it is a wire connection command with code "M60" indicating the machining starting position or not (step a5). If it is not the wire connection command "M60", the processing flow returns to step a1. On the other hand, if it is the wire connection command "M60", the index n is set to "0" (step a6) and the present positions Px, Py stored in the register are compared with the machining starting positions (wire connection command position) that have already been stored in the memory units Mx(n), My(n) in the column corresponding to the value of index n (=0) in the machining starting position table T shown in FIG. 5, which was provided in the memory 12, and a decision is made as to whether the present position is the machining starting position that has already been stored (step a7). Thus, a decision is made as to whether the present position Px of the X axis is identical to the machining starting position stored in the X axis memory unit Mx(n) with the index n, and whether the present position Py of the Y axis is identical to the machining starting position stored in the Y axis memory unit Mx(n) with the index n.

The memory units Mx(n), My(n), Mc(n) of the machining starting position table are cleared by initial setting conducted when the power source of the controller 10 is turned on, and the below-described register K is also set to "0".

At the very beginning, because the machining starting position has not been stored, the "No" decision is made in step a7, the processing flow proceeds to step a8, and a decision is made as to whether the index value and the value stored in the register K coincide or not. At the very beginning, because the register K has been set to "0" by the initial setting, the values coincide, the processing flow proceeds to step a9, and the present positions Px, Py are stored in respective memory units Mx(n), My(n) corresponding to the index n (=0). Then, "1" is set in the memory unit Mc(n) for calculating the machining estimation frequency for the machining shape corresponding to the machining starting position and "1" is added to the register K for calculating the number of machining shapes (step a10).

The processing flow then returns to step a1 and the above-described processing is executed. When the wire connection command "M60" is read out again and the decision confirming the machining starting position is made in step a5, in step a7 a decision is made as to whether or not the present positions Px, Py coincide with the machining starting positions that have already been stored in memory units Mx(n), My(n) corresponding to the index n. If the positions do not coincide, the processing flow proceeds to step a8 and because the register K has already been set to "1", the processing flow proceeds from step a8 to step a11, the index n is incremented by 1, and comparison is conducted with the machining starting positions stored in the memory units Mx(n), My(n) corresponding to this index n. When the position has not been stored, the comparison result is "No", a n=K (=1) decision is made in step a8, processing of steps a9, 10 is then conducted, and the processing flow returns to step a1.

Each time a new machining starting position is thus found (each time the wire connection command "M60" is read out), the machining starting positions (Mx(n), My(n)) are stored in the machining starting position table, and the machining estimation frequency for the machining shape corresponding to the machining starting position is stored in the memory unit Mc(n).

Processing from step a1 to step a11 is then executed. If the present positions Px, Py indicating the machining starting position were found in step a7 to coincide with the machining starting positions (Mx(n), My(n)) that have already been stored, the processing flow proceeds from step a7 to step a12, "1" is added to the memory unit Mc(n) storing the machining frequency for the machining shape corresponding to the machining starting position, and the processing flow returns to step a1. Each time the identical machining starting positions are thus detected, "1" is added to the memory unit Mc(n) and the number of machining shapes corresponding to this machining starting position is calculated. Each time a new machining starting position is detected, the register K is incremented by 1 and the number of machining shapes is calculated.

As described above, the processing which detects a machining starting position is executed by reading a machining program, without executing the machining, and if the program end is detected in step a2, the processing ends. At this time, the machining starting positions (Mx(n), My(n)) for each machining shape such as shown in FIG. 5 and the machining estimation frequency (Mc(n)) thereof are stored.

Figures 5, 6:
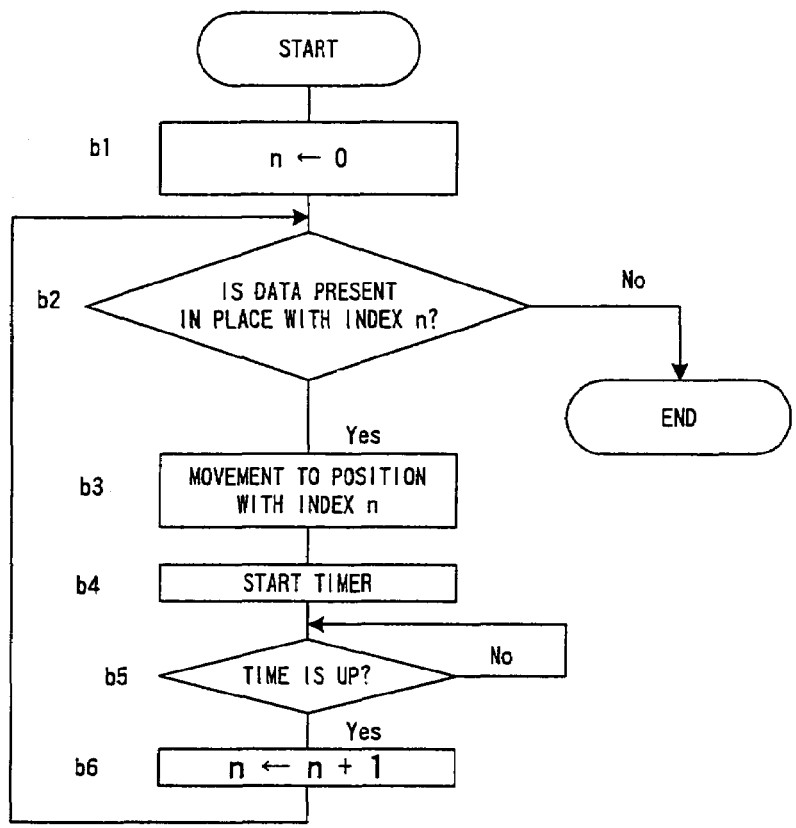
FIG. 5 is an explanatory drawing of a machining starting position table in the embodiment of the present invention.
FIG. 6 is a flow chart of machining starting hole check processing in the embodiment of the present invention.

If the data read command is input, a table showing the machining starting positions and frequency, such as shown in FIG. 5, is displayed on the display 13. At this time, the n column shown in FIG. 5 is displayed as the machining number by adding 1 to n in the sequence of 0→1, 1→2, ... n→n+1. Thus, the last of the machining numbers becomes equal to the number of machining shapes (value of register K).

The display of the data as shown in FIG. 5 may be conducted after step a2 in which the program end is detected.

The machining starting hole check processing is then conducted based on the machining starting hole data found as described above. When the wire electric discharge machining apparatus operates without an operator, for example, in the nighttime according to the machining program, if the machining starting holes that have to be machined in advance have not been machined, the machining is terminated and not completed when it has to be completed. This problem can be avoided by making it possible to confirm, before the machining is started, that the machining starting holes have been provided in the prescribed machining starting positions.

If a machining starting hole check command is input in a state in which the machining liquid is ejected from an upper nozzle, the processor 11 of the controller 10 starts the processing shown in FIG. 6.

First, the index n is set to "0" (step b1) and a decision is made as to whether or not data has been stored in the positions (Mx(n), My(n)) corresponding to the index n of the machining starting position table T such as shown in FIG. 5 (step b2). If the data is present, a transition is made to the machining starting position (step b3), the timer for measuring the prescribed time is started, and a decision is made as to whether the time of the timer is up or not (steps b4, b5). If the time is up, the index n is incremented by 1 (step b6), and the processing flow returns to step b2. The nozzle is then moved to each machining starting position stored in the machining starting position table T (if the wire was connected, the movement position would be a machining initiation position, however, as the wire is not connected, the movement position is the upper nozzle position with respect to a workpiece, that is, simply a nozzle position) and the operation is conducted which is terminated after the prescribed time. Because this operation is conducted within a short time, the operator monitors the operation of the wire electric discharge machining apparatus and checks by observations as to whether or not a machining starting hole has been provided in the position in which the machining liquid hits the workpiece when the upper nozzle is stopped.

Further, instead of steps b4, b5, for example, a machining starting hole check button may be provided and the processing flow may proceed to step b6 when the operator inputs the check command with the machining starting hole check button upon checking as to whether the machining starting hole is present or not where the upper nozzle has stopped.

Figure 7:
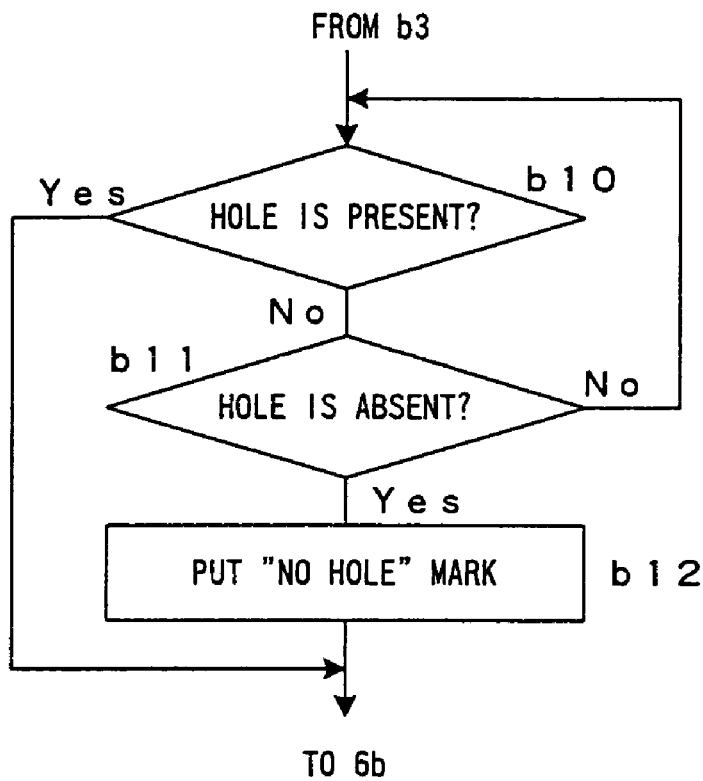
FIG. 7 is part of a flow chart of another embodiment of machining starting hole check processing.

Furthermore, for example, a mark may be put in the machining starting position in order to define a machining starting position where no machining starting hole has been provided. In this case, a column comprising marks indicating the presence of the machining starting hole is provided in the machining starting position table T. FIG. 7 illustrates the main processing conducted in this case. The processing shown in FIG. 7 is conducted instead of steps b4, b5 shown in FIG. 6. A transition is made from step b3 shown in FIG. 6 to step b10 shown in FIG. 7, the operator checks as to whether the machining starting hole has been provided or not and inputs a hole-present check signal if the hole has been provided and a no-hole check signal if the hole has not been provided (steps b10, b11). If the hole-present check signal is obtained, the processing flow proceeds to step b6 shown in FIG. 6, and when the no-hole check signal is input, a mark indicating the absence of the machining starting hole is put in the machining starting position table T (step b12) and the processing flow returns to step b6. Furthermore, in the example illustrated by FIG. 7, a mark is put when no hole has been provided, but it is also possible to put a mark when the hole is present. Further, marks indicating the presence and absence of the machining starting hole may be put, respectively.

When the contents of the machining starting position table is displayed on the display screen after the marks have thus been put in the machining starting position table T, the marks may be displayed as they are or they may be displayed so that the machining starting position record column having no-hole marks put therein can be distinguished, for example, by a different color or brightness.

Figure 8:
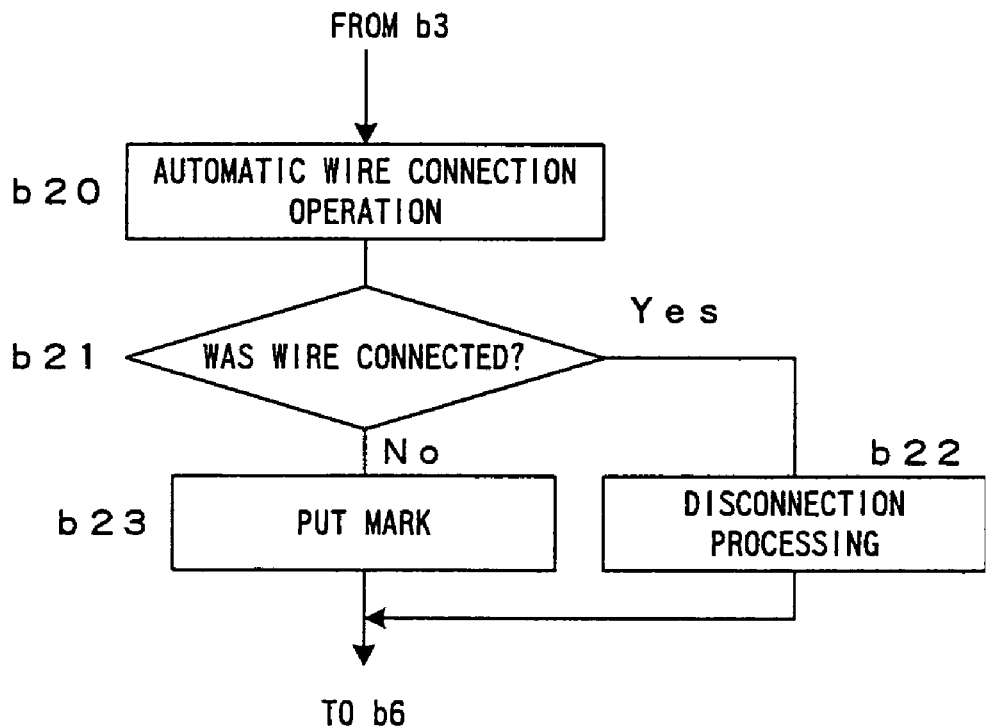
FIG. 8 is part of a flow chart of yet another embodiment of machining starting hole check processing.

In the above-described example, the machining starting holes are checked by the operator, but the wire electric discharge machining apparatus itself may automatically inspect and check the presence or absence of machining starting holes by using an automatic wire connection apparatus 23. FIG. 8 shows part of the processing flow relating to this case. Once processing of steps b1–b3 illustrated by FIG. 6 has been completed, the processing flow proceeds to step b20 shown in FIG. 8, an automatic wire connection operation is conducted and a decision is made as to whether the wire connection has been completed or not (step b21). If the wire connection has not been completed, a mark is put into the machining starting position table T to the effect that the machining starting hole is absent or defective (step b23), and the processing flow proceeds to step b6 of FIG. 6. Furthermore, if the wire connection is found to be completed in step b21, the processing flow proceeds to step b6, without putting a mark.

As described hereinabove, whether or not a machining starting hole has been provided in a machining starting position can be easily checked before the machining is started, that is, before the machining program is executed, and the preparation can be made such that the machining program can be executed without a delay when operation without an operator is started.

On the other hand, in a case where the machining shape to be machined has been programmed in the machining program, but when it is not necessary to machine this machining shape, or a case where the machining is wished to be conducted by omitting part of finish machining, only a part of machining program for a desired machining can be executed.

In this case, if the machining frequency display command is input from the input means 14, the processor 11 displays on the screen of the display 13 the machining estimation frequency of the machining shape shown in FIG. 9, based on the data that has been stored in the machining starting position table T. The symbol "−" in the column of the machining estimation frequency with respect to the machining number in FIG. 9 indicates that machining has been instructed by the machining program.

In the machining estimation frequency display table thus displayed, the operator inputs a symbol "/", as shown in FIG. 10, with respect to machining which is not presently required and is not conducted. FIG. 10 illustrates an example in which the setting has been done such that the third and fourth machining (finish machining) of machining number 3 and the entire machining relating to the machining shape of machining number 4 are not executed.

With such a setting indicating that no machining is to be conducted, the processor 11 provides a memory unit Mc(n)', as shown in FIG. 11, for storing the machining determined frequency correspondingly to the machining starting position table T and stores the number obtained by subtracting the number that was set as requiring no machining initiation from the machining estimation frequency stored in the memory unit Mc(n) as the machining determined frequency in the memory unit Mc(n)'.

As described hereinabove, the operator can select only the required machining from the machining operations that have been instructed by the machining program.

Figure 12:
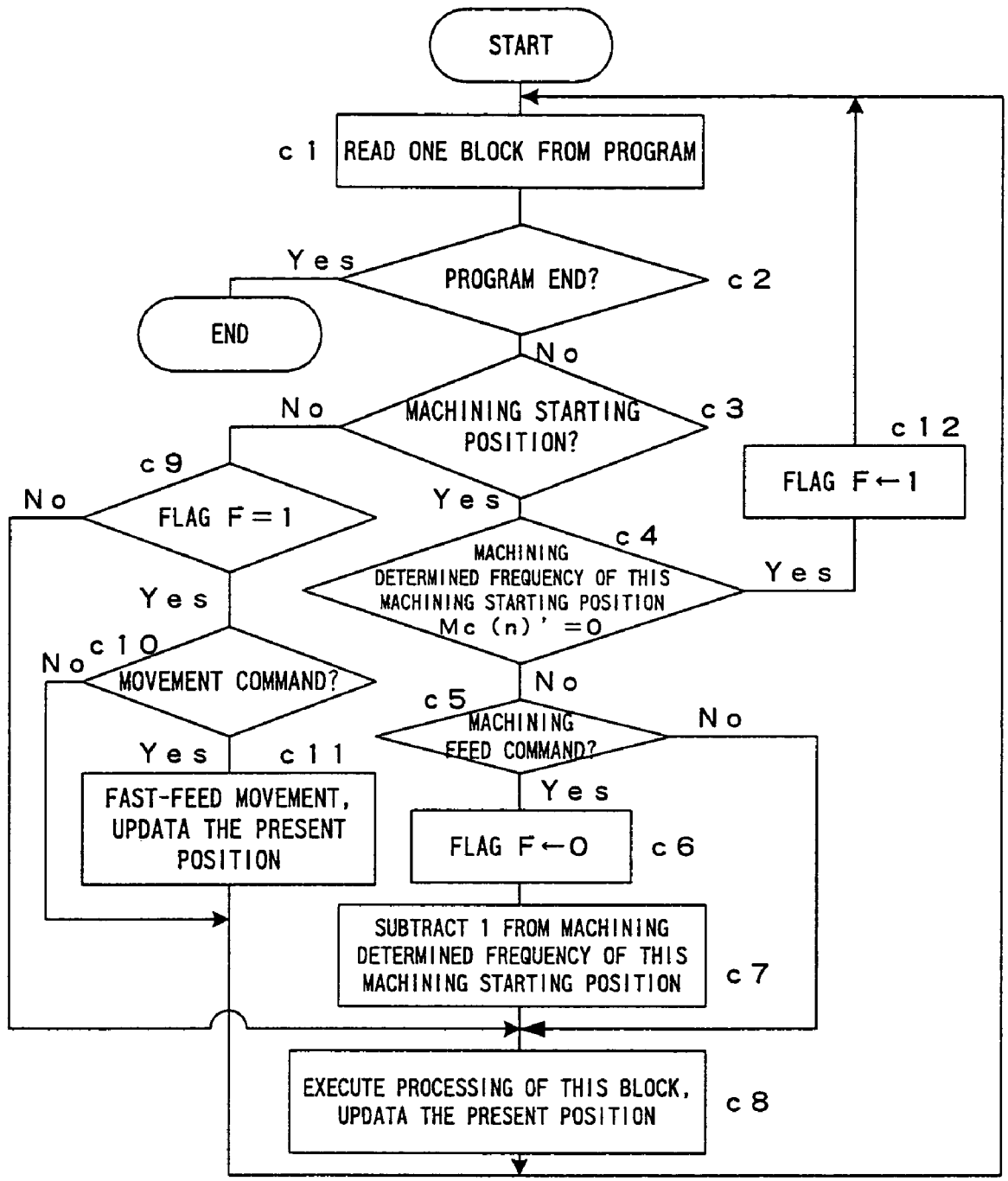
FIG. 12 is a flow chart of machining processing based on program execution after the machining shape and the finish machining frequency have been selected and set, in the embodiment of the present invention.

On the other hand, when the machining program is executed and machining is conducted after the machining shape and the frequency of finish machining have thus been selected and set, the processor 11 of the controller 10 of the wire electric discharge machining apparatus executes the processing shown by the flow chart in FIG. 12.

The processor 11 reads one block from the head of the machining program (step c1) and makes a decision as to whether the program command that has been read out is a program end or not (step c2). If it is not the end, the processor makes a decision as to whether or not the present position coincides with the position that has been set and stored in the machining starting position table T (step c3). If the positions do not coincide, the processor makes a decision as to whether a flag F is "1" or not (step c9). Because the flag F has been set to "0" by the initial setting when the power of the wire electric discharge machining apparatus was turned on, originally the flag is "0". Therefore, the processing flow proceeds to step c7 and processing of the present block that was read in is executed. Further, updating of the present position is conducted. The processing flow then returns to step c1.

On the other hand, if in step c3 a decision is made that the present position coincides with the position that has been set and stored in the machining starting position table T, then a decision is made as to whether the machining determined frequency that has been stored in the memory unit Mc(n)' correspondingly to the present machining starting position of the machining starting position table T is "0" or not (step c4). If the decision result is not "0", then a decision is made as to whether or not the command read in the present block is a machining feed command such as G01, G02, G03, and the like (step c5). If the decision result is a machining command, the flag F is set to "0" (step c6), "1" is subtracted from the machining determined frequency stored in the memory unit Mc(n)' (step c7), and processing of the present block is executed (step c8), followed by the return to step c1. Further, when the command is found not to be a machining command (for example, it was found to be a wire connection command "M60") in step c5, the processing flow proceeds to step c8.

Because the flag F became "0" in step C6, the processing of steps c1, c2, c3, c9, c8 is repeatedly executed till the next machining starting position is reached.

When it is determined in step c3 that the present position is the machining starting position, and the machining determined frequency stored in the memory unit Mc(n)' corresponding to this machining starting position is found to be other than "0" in step c4, the processing of the above-described steps c5–c8 is conducted. On the other hand, when the machining determined frequency stored in the memory unit Mc(n)' became "0" in step c4, that is, when the machining determined frequency stored in the memory unit Mc(n)' became "0" due to the above-described "no machining" setting, despite the fact that the machining starting position has been programmed and machining of the machining shape has been instructed by the machining program, the processing flow makes a transition from step c4 to step c12, sets "1" in flag F1 and returns to step c1. In this case, processing in response to wire connection command "M60" or machining feed commands such as "G01, G02, G03" that were read remains unexecuted.

Further, when the flag F is set to "1", processing is conducted in the order of steps c1, c2, c3, c9 till the next machining starting position is detected in step c3, the processing flow makes a transition from step c9 to step c10, and a decision is made as to whether the command of the block that was read in is a movement command or not. If it is a movement command, a fast-feed movement is executed, the present position is updated, and the processing flow returns to step c1. On the other hand, if the command is not a movement command, the processing flow returns to step c1, without executing the command of this block. Thus, when the flag F is set to "1", all the movement commands instructed by the program relate to fast-feed movement and are ignored, without conducting the machining. The above-described processing is executed till the program ends.

As described hereinabove, only the desired machining is executed only with respect to the desired machining shape in the machining program.

Further, in accordance with the present invention the machining shape may be also displayed on a screen of display 13 and the machining sequence may be also displayed with respect to the displayed machining shape.

Figure 13:
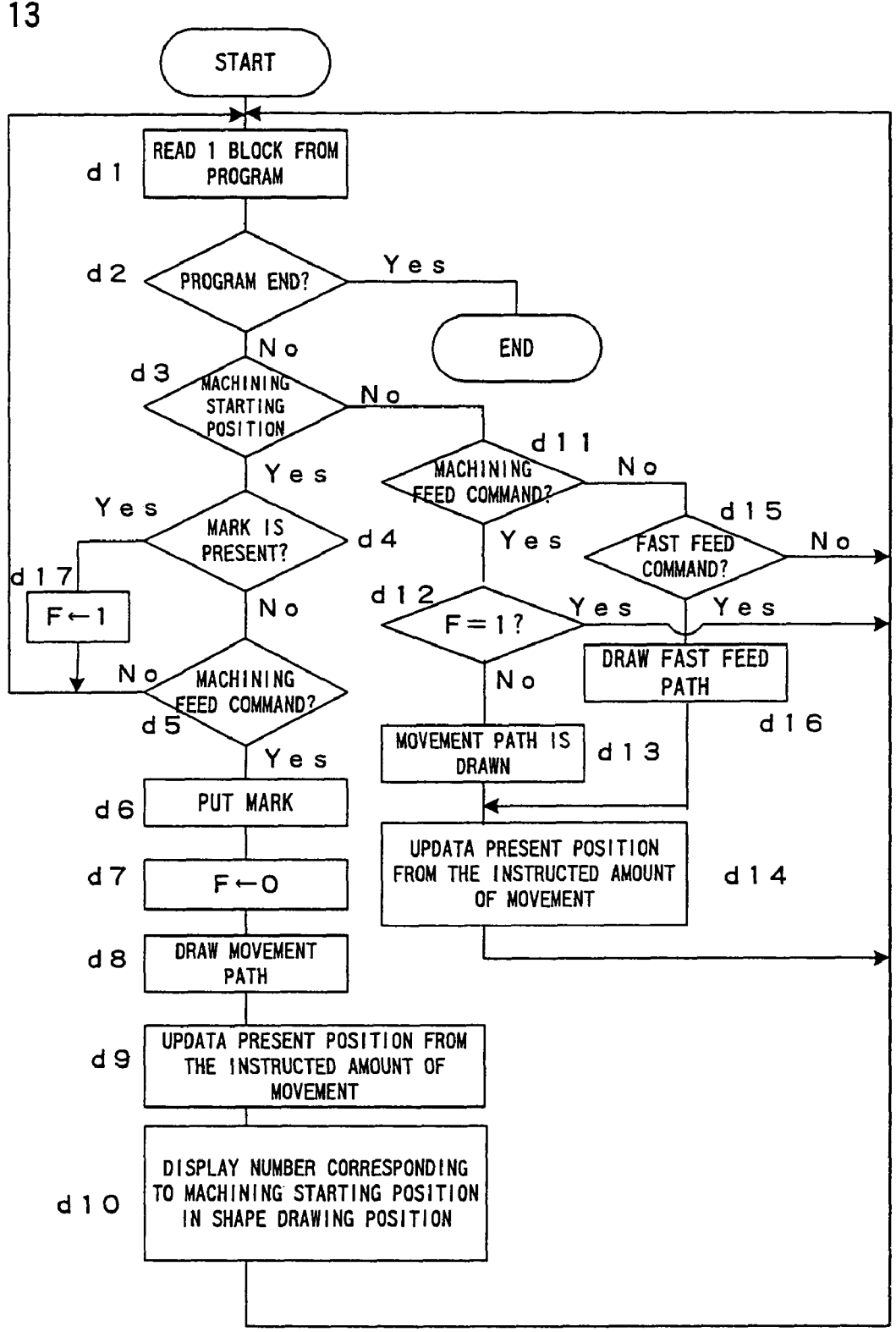
FIG. 13 is a flow chart of display processing of the machining shape drawing and the machining sequence in the embodiment of the present invention.

FIG. 13 is a flow chart of the display processing of the machining shape drawing and the machining procedure.

If the machining shape drawing command is input, the processor 11 reads out one block from the machining program (step d1) and makes a decision as to whether it is a program end or not (step d2). If it is not the end, the processor makes a decision as to whether or not the present position coincides with the position set and stored in the machining starting position table T (step d3). If the positions coincide, a decision is made as to whether or not the command of this block is a machining feed command such as G01, G02, G03, or the like, and then as to whether it is a fast-feed command G00 or not (steps d11, d15). If it is not the fast-feed command, the processing flow returns to step d1.

On the other hand, if the present position is decided to be a machining starting position in step d3, a decision is made as to whether or not a mark has been put into the column of the machining starting position table T where this machining starting position is stored (step d4). Because no mark is initially put, the processing flow proceeds to step d5 and a decision is made as to whether the command of the block that has been read out is the machining feed command or not. When it is not the machining feed command such as the wire connection command "M60", the processing flow returns to step d1. On the other hand, if it is a machining feed command, a mark is put in the memory unit storing the present machining starting position of the machining starting position table T and the flag F is set to "0" (step d6, d7). Further, in the initial setting made when the power source is turned on, the flag F is set to "0" and the mark is erased.

Further, the movement path of the machining movement command is displayed on the screen of display 13 (step d8). The present position is updated by the quantity of movement (step d9), the numeric value obtained by adding 1 to the index of the machining starting position is displayed in the position separated by the set amount from the machining starting position (step d10), and the processing flow returns to step d1.

If the command of the present block that was read in step d1 is decided to be a machining feed command (step d11) in a state in which the present position is not the machining starting position, a decision is made as to whether the flag F is "1" or not (step d12). If it is not "1", the movement path of the machining movement command is displayed on the screen of display 13 (step d13), the present position is updated by the quantity of movement (step d14), and the processing flow returns to step d1.

If the command of the block that was read in step d1 is decided to be a fast-feed command (step d15), the path of this fast-feed command is drawn with lines indicating a fast feed (step d16), the present position is updated (step d14), and the processing flow returns to step d1.

Further, when the present position was decided to be the machining starting position in step d3 and a decision was made that a mark has been put in the present machining starting position of the machining starting position table T (step d4), the flag F is set to "1" and the processing flow returns to step d1. When the mark has been put, it means that drawing of the present machining shape was previously done, the number showing the machining sequence has also been displayed, and the current machining starting position is the machining starting position of the finish machining. Therefore, drawing is not conducted and the processing flow returns to step d1. On the other hand, when the flag F has been set to "1", no drawing is conducted in step d12 even if the command is a machining feed command, and the processing flow returns to step d1. Thus, the machining number and machining shape are drawn only during the rough machining which is the initial machining of machining shapes, and the machining path of finish machining is not drawn.

Figure 14:
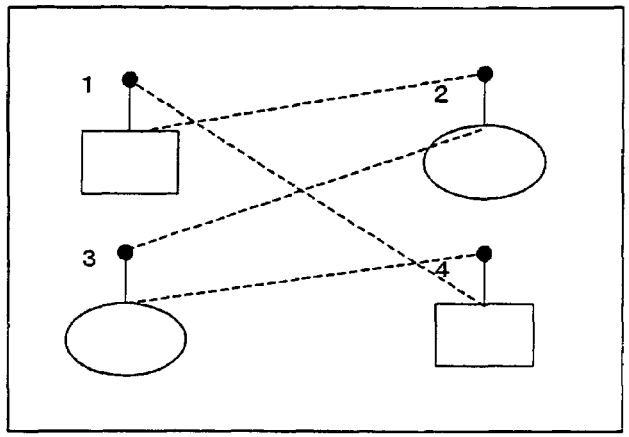
FIG. 14 shows an example relating to displaying the machining shape drawing and the machining sequence.

FIG. 14 shows an example relating to displaying machining shapes and the machining sequence on the screen of display 13. In this example, the machining feed is shown by solid lines and the fast feed is shown by broken lines. The machining sequence is displayed in the prescribed position at the prescribed distance from the machining starting position.

Figure 15:
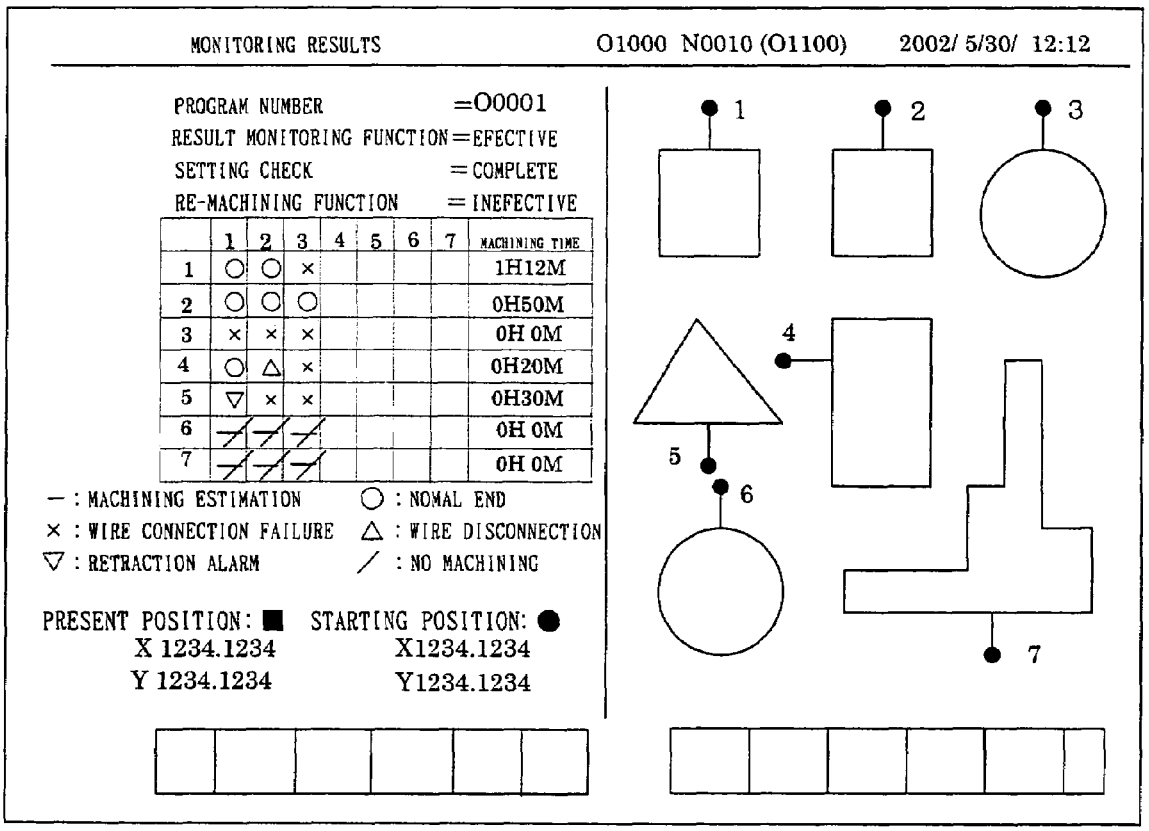
FIG. 15 shows a display example of monitoring results in the embodiment of the present invention.

FIG. 15 shows an example of a display screen obtained when the machining operation in the present embodiment is monitored and the monitoring results were displayed on the screen of display 13. In FIG. 15, the program number is the number of the machining program used for machining and the result monitoring function is a column for setting as to whether the monitoring function is executed or not. In this example, it is set to "Effective". Further, the "Setting check" is a column displaying as to whether checking, e.g., of the machining starting position, as shown, e.g., in FIG. 5 and FIG. 6, is conducted. In this example, "Complete" showing that checking was conducted is displayed. Further, the "Re-machining function" is the setting indicating as to whether or not machining will be again automatically conducted when the machining has not be conducted for any reason, despite the fact that it had to be conducted. In this example, the setting is "Ineffective", this setting showing that no re-machining is conducted.

The table in the left column shows the machining frequency (abscissa) with respect to the number (ordinate) showing each machining shape such as shown in FIG. 9 or FIG. 10. Further, the symbol "–" described in the table denotes the machining estimation that has been programmed by the machining program, "○" shows that the machining has been normally conducted, "×" represents the wire connection failure of the wire electrode, "Δ" shows the disconnection of the wire electrode, "∇" shows that the wire electrode was retracted along the machining groove and an alarm was generated, and "/" shows that the setting was such as to conduct no machining. Further, the present position indicates the upper nozzle position with respect to the workpiece, and the starting position displays the machining starting position of a machining shape when a cursor is positioned on the number representing this machining shape in the above-described table. Further, drawings of the machining shapes that have been programmed and the numbers showing the machining sequence for the machining shapes thus drawn are displayed in the right half of the display screen. The machining results, too, can be thus monitored.

What is claimed is:

1. A wire electric discharge machining apparatus comprising:
   means for analyzing a machining program and acquiring machining starting positions;
   storage means for calculating and storing an acquisition frequency for each acquired machining starting position;
   means for displaying data of a number of machining shapes and a machining frequency of each machining shape from data stored in said storage means; and
   means for successively reading the machining starting positions stored in said storage means, causing movement to each machining starting position that was read out, conducting an the automatic wire connection operation, and conducting checking of a machining starting hole.

2. The wire electric discharge machining apparatus according to claim 1, comprising means for displaying the presence or absence of the machining starting hole based on the signal showing whether the automatic wire connection was made or not, this signal coming from said means for conducting checking of a machining starting hole.

3. The wire electric discharge machining apparatus according to claim 1, comprising means for successively reading the machining starting positions stored in said storage means and causing the movement to each machining starting position that was read out and a stop for a prescribed time.

4. The wire electric discharge machining apparatus according to claim 1, comprising means for setting the presence or absence of machining for each machining shape and machining frequency based on the data on the number of machining shapes and machining frequency of each machining shape.

5. The wire electric discharge machining apparatus according to claim 1, further comprising display control means for drawing the machining shape on display means based on the machining program and means for displaying the indexes of machining order based on the storage order of machining starting positions stored in said storage means when said machining shape is drawn.

6. A wire electric discharge machining apparatus comprising:
   means for analyzing a machining program and acquiring machining starting positions;
   storage means for calculating and storing an acquisition frequency for each acquired machining starting position;
   means for displaying data of a number of machining shapes and a machining frequency of each machining shape from data stored in said storage means;
   machining hole check input means; and
   means for successively reading the machining starting positions stored in said storage means, causing the movement to each machining starting position that was read out and a stop for a prescribed time, and causing the movement to the next machining starting position each time a check signal is input from said machining hole check input means.

7. The wire electric discharge machining apparatus according to claim 6, wherein said machining hole check input means comprises means for generating a check signal indicating the presence of a machining starting hole and a check signal indicating the absence of a machining starting hole, and the apparatus further comprises means for receiving the signals from said machining hole check input means and displaying the presence or absence of the machining starting hole.

8. A method for controlling a wire electric discharge machining apparatus, comprising:
   analyzing a machining program and acquiring machining starting positions;
   calculating and storing an acquisition frequency for each acquired machining starting position;
   displaying data of a number of machining shapes and a machining frequency of each machining shape from stored data; and
   successively reading the machining starting positions, causing movement to each machining starting position that was read out, conducting an the automatic wire connection operation, and conducting checking of a machining starting hole.

* * * * *

UNITED STATES PATENT AND TRADEMARK OFFICE
CERTIFICATE OF CORRECTION

PATENT NO. : 7,013,195 B2 Page 1 of 1
APPLICATION NO. : 10/642146
DATED : March 14, 2006
INVENTOR(S) : Susumu Maki It is certified that error appears in the above-identified patent and that said Letters Patent is hereby corrected as shown below:

Drawings, Sheet 1 of 9, FIG. 1, change "STRAGE MEDIUM" to --STORAGE MEDIUM--

Drawings, Sheet 6 of 9, FIG. 11, change "CHINING STARTING POSITION" to --MACHINING STARTING POSITION--

Drawings, Sheet 9 of 9, FIG. 15, change "EFECTIVE" to --EFFECTIVE--

Drawings, Sheet 9 of 9, FIG. 15, change "INEFECTIVE" to --INEFFECTIVE--

Drawings, Sheet 9 of 9, FIG. 15, change "NOMAL" to --NORMAL--

Column 12, line 30, after "apparatus" insert -- , --

Column 12, line 43, delete "the"

Column 13, line 4, after "apparatus" insert -- , --

Column 13, line 19, delete "the (first occurence)"

Column 14, line 19, delete "the"

Signed and Sealed this

Twenty-sixth Day of December, 2006

JON W. DUDAS
*Director of the United States Patent and Trademark Office*